United States Patent
Kim et al.

(10) Patent No.: US 8,654,674 B2
(45) Date of Patent: Feb. 18, 2014

(54) METHOD AND APPARATUS FOR DATA COMMUNICATION WHILE BASE STATION IS DISRUPTED IN WIRELESS COMMUNICATION SYSTEM

(75) Inventors: Kyung-Kyu Kim, Seoul (KR); Jung-Je Son, Suwon-si (KR); Chang-Yoon Oh, Suwon-si (KR); Young-Kyo Baek, Seoul (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 13/209,196

(22) Filed: Aug. 12, 2011

(65) Prior Publication Data

US 2012/0039308 A1 Feb. 16, 2012

(30) Foreign Application Priority Data

Aug. 12, 2010 (KR) ........................ 10-2010-0077615

(51) Int. Cl.
*H04L 12/28* (2006.01)
(52) U.S. Cl.
USPC .......................................... 370/254; 370/329
(58) Field of Classification Search
USPC ........... 370/254, 342, 336, 329; 709/226, 237
See application file for complete search history.

(56) References Cited

U.S. PATENT DOCUMENTS

| | | | |
|---|---|---|---|
| 6,876,643 B1* | 4/2005 | Aggarwal et al. | 370/338 |
| 2003/0007461 A1* | 1/2003 | Chen et al. | 370/254 |
| 2003/0012168 A1* | 1/2003 | Elson et al. | 370/338 |
| 2004/0003111 A1* | 1/2004 | Maeda et al. | 709/237 |
| 2008/0062945 A1* | 3/2008 | Ahuja et al. | 370/342 |
| 2010/0268825 A1* | 10/2010 | Jeong et al. | 709/226 |

* cited by examiner

*Primary Examiner* — Albert T Chou (57) ABSTRACT

A method provides data communication while a Base Station (BS) is disrupted in a wireless communication system. The method includes, when a plurality of Mobile Stations (MSs) receive a preamble signal from a cluster header through a dedicated control channel while the BS is disrupted, sending a message requesting cluster member subscription to the cluster header, in the cluster header, including the plurality of MSs in a cluster member, configuring a cluster member list, and broadcasting the cluster member list, in a source MS among the plurality of MSs, sending a data transmission request message to the cluster header using the broadcasted cluster member list, in the cluster header, one of unicasting and broadcasting a response message for the data transmission request of the source MS, and, in the source MS, transmitting data to a target MS among the plurality of MSs based on the response message.

44 Claims, 9 Drawing Sheets

METHOD AND APPARATUS FOR DATA COMMUNICATION WHILE BASE STATION IS DISRUPTED IN WIRELESS COMMUNICATION SYSTEM

CROSS-REFERENCE TO RELATED APPLICATION(S) AND CLAIM OF PRIORITY

The present application is related to and claims priority under 35 U.S.C. §119 to a Korean Patent Application filed in the Korean Intellectual Property Office on Aug. 12, 2010 and assigned Serial No. 10-2010-0077615, the contents of which is herein incorporated by reference.

TECHNICAL FIELD OF THE INVENTION

The present invention generally relates to a wireless communication system. More particularly, the present invention relates to a method and apparatus for supporting data communication of a plurality of Mobile Stations (MSs) while a BS (Base Station) providing a communication service to the plurality of MSs is disrupted.

BACKGROUND OF THE INVENTION

In a cellular wireless communication system, an area where the system operates is subdivided into a plurality of cells, and each cell is defined as a communication-possible zone of a BS. Each BS can connect to a system controller controlling a whole operation of a system, or a system control function can be distributed between BSs. An MS being busy communicates with a BS of a cell in which the MS is currently located itself. The communication is achieved through a wireless channel according to a defined wireless protocol. For one example, the communication is achieved using an Orthogonal Frequency Division Multiplexing/Orthogonal Frequency Division Multiple Access (OFDM/OFDMA) technique according to the Institute of Electrical and Electronics Engineers (IEEE) 802.16 standard protocol.

On the other hand, while a BS providing a communication service to the MS is disrupted due to a natural disaster such as an earthquake and the like, the MS cannot be serviced within a coverage area of the BS until before the MS can connect with a different BS or can connect with a neighbor BS through a repeater.

Due to an increase of a demand for reliable communication, the MS should be able to receive a communication service irrespective of BS disruption.

Accordingly, there is a need for a method and apparatus for data communication while a BS is disrupted in a wireless communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present disclosure is to provide a method and apparatus for data communication while a Base Station (BS) is disrupted in a wireless communication system.

Another aspect of the present disclosure is to provide a method and apparatus for establishing Peer-to-Peer (P2P) communication between Mobile Stations (MSs) while a BS is disrupted in a wireless communication system.

A further aspect of the present disclosure is to provide a method and apparatus for setting a gateway between clustering groups while a BS is disrupted in a wireless communication system.

The above aspects are achieved by providing a method and apparatus for data communication while a BS is disrupted in a wireless communication system.

According to one aspect of the present disclosure, a method for data communication while a BS is disrupted in a wireless communication system is provided. The method includes, when a plurality of Mobile Stations (MSs) receive a preamble signal from a cluster header through a dedicated control channel while a BS is disrupted, sending a message of requesting cluster member subscription to the cluster header, in the cluster header, including the plurality of MSs in a cluster member, configuring a cluster member list, and broadcasting the cluster member list, in a source MS among the plurality of MSs, sending a data transmission request message to the cluster header using the broadcasted cluster member list, in the cluster header, unicasting or broadcasting a response message for the data transmission request of the source MS, and, in the source MS, transmitting data to a target MS among the plurality of MSs based on the response message.

According to another aspect of the present disclosure, a gateway determination method for data communication while a BS is disrupted in a wireless communication system is provided. The method includes, when a member of a first cluster senses a preamble signal from a header of a second cluster, inquiring of a header of the first cluster whether to merge with the second cluster, when the header of the first cluster requests a merger of the first cluster and second cluster, in the member of the first cluster, sending an access request to the header of the second cluster, when a header of the second cluster permits the merger of the first cluster and second cluster, transmitting member information of the second cluster to the member of the first cluster, determining a main cluster based on information on members of the first cluster and information on members of the second cluster, and in the header of the second cluster, performing synchronization based on a synchronization signal of the main cluster.

According to a further aspect of the present disclosure, a method for data communication while a BS is disrupted in a wireless communication system is provided. The method, when receiving a preamble signal from a cluster header through a dedicated control channel while a BS is disrupted, sending a message of requesting cluster member subscription to the cluster header, receiving a cluster member list from the cluster header, sending a data transmission request message to the cluster header using the broadcasted cluster member list, and receiving a response message for the transmission request message from the cluster header, and transmitting data to a target MS.

According to yet another aspect of the present disclosure, a method for data communication while a BS is disrupted in a wireless communication system is provided. The method includes, after broadcasting a preamble signal through a dedicated control channel while a BS is disrupted, receiving a message of requesting cluster member subscription from at least one MSs, after including the at least one MSs in the cluster member and constructing and broadcasting a cluster member list, receiving a data transmission request message from a source MS, and unicasting or broadcasting the response message for the data transmission request of the source MS.

According to still another aspect of the present disclosure, a method for data communication while a BS is disrupted in a wireless communication system is provided. The method includes, when receiving a preamble signal from a cluster header through a dedicated control channel while a BS is disrupted, sending a message of requesting cluster member subscription to the cluster header, receiving cluster member list and resource allocation information from the cluster header, and receiving data transmitted by a source MS, based on the resource allocation information.

According to still another aspect of the present disclosure, a system for data communication while a BS is disrupted in a wireless communication system is provided. The system includes a plurality of MSs for, when receiving a preamble signal from a cluster header through a dedicated control channel while a BS is disrupted, sending a message of requesting cluster member subscription to the cluster header, the cluster header for including the plurality of MSs in a cluster member, configuring a cluster member list, and broadcasting the cluster member list, a source MS for sending a data transmission request message to the cluster header using the broadcasted cluster member list. The cluster header unicasts or broadcasts a response message for the data transmission request of the source MS. The source MS transmits data to a target MS among the plurality of MSs based on the response message.

According to still another aspect of the present disclosure, a system for data communication while a BS is disrupted in a wireless communication system is provided. The system includes a header of a first cluster including a member of the first cluster, the member of the first cluster for, when sensing a preamble signal from a header of a second cluster, inquiring of the header of the first cluster whether to merge with the second cluster and, when the header of the first cluster requests a merger of the first cluster and second cluster, sending an access request to the header of the second cluster, and a header of the second cluster for, when permitting the merger of the first cluster and second cluster, transmitting member information of the second cluster to the member of the first cluster. The header of the first cluster determines a main cluster based on information on members of the first cluster and information on members of the second cluster. The header of the second cluster performs synchronization based on a synchronization signal of the main cluster.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification Exemplary embodiments of the present disclosure provide a method and apparatus for data communication while a Base Station (BS) is disrupted in a broadband wireless communication system. Here, the broadband wireless communication system is described by way of an example of an Institute of Electrical and Electronics Engineers (IEEE) 802.16m system, but the exemplary embodiments of the present disclosure are undoubtedly applicable to a cellular system composed of a plurality of BSs.

Figure 1:
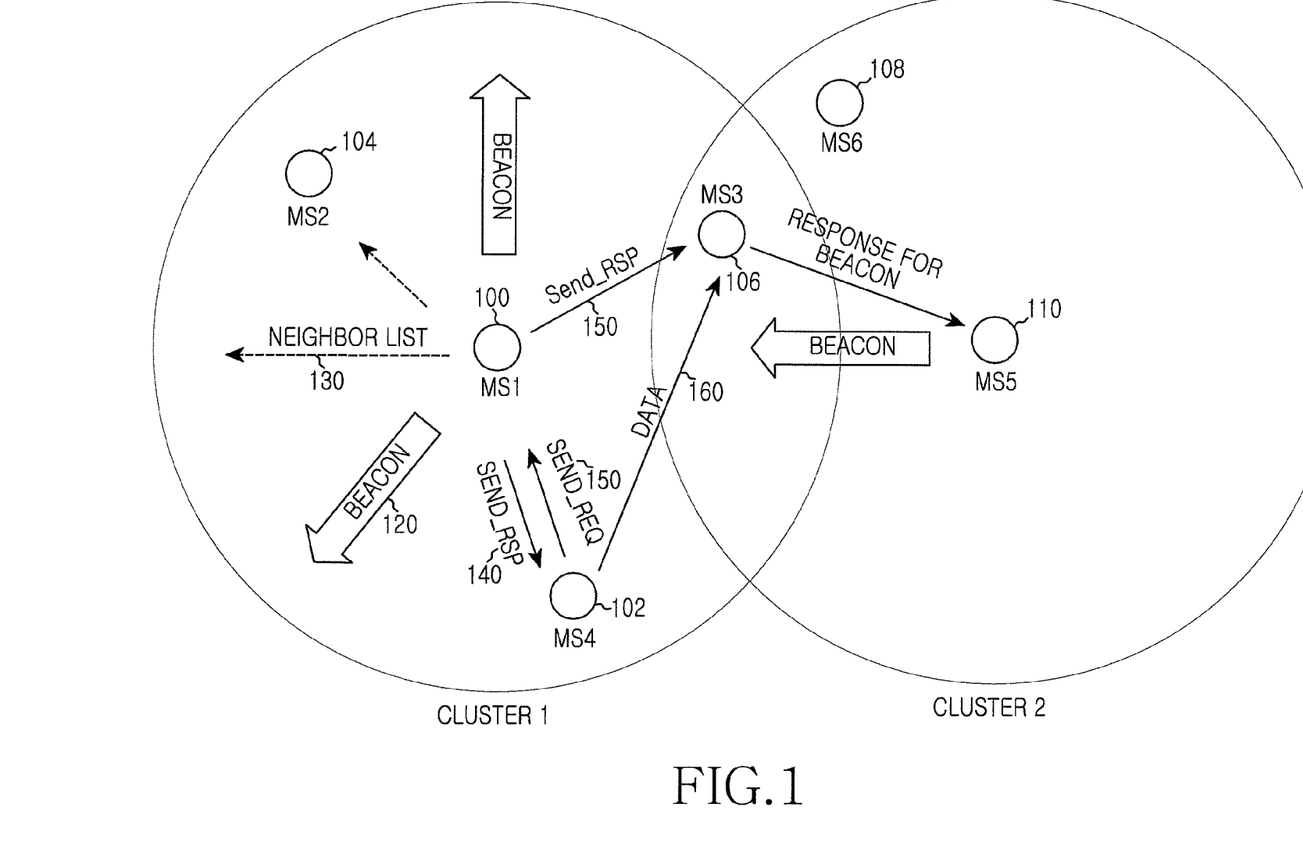
FIG. 1 is a diagram illustrating the scenario of communication establishment for a plurality of Mobile Stations (MSs) while a Base Station (BS) providing a communication service to the plurality of MSs within service coverage is disrupted in a broadband wireless communication system according to a first exemplary embodiment of the present disclosure.

FIG. 1 illustrates the scenario of communication establishment for a plurality of Mobile Stations (MSs) while a BS providing a communication service to the plurality of MSs within service coverage is disrupted in a broadband wireless communication system according to a first exemplary embodiment of the present disclosure.

Referring to FIG. 1, a current network environment is an environment in which a BS (not shown) can no longer provide a communication service to MSs within its own cell because of a natural disaster (e.g., an earthquake, a storm, a tidal wave and the like) or other physical damage.

In this environment, MSs 100 to 110 automatically restore a network to communicate with each other. At this time, each of the MSs 100 to 110 can constitute a cluster according to a predefined procedure. Since there is a difference between a distance in which a serving BS can forward data and a distance in which an MS can forward data, the MSs 100 to 110 belonging to one cell can be divided into several clusters before the MSs 100 to 110 are damaged. For example, if the serving BS is disrupted within the same cell coverage, the MSs 100 to 106 constitute a first cluster, and the MSs 106 to 110 constitute a second cluster. A method for optimizing the cluster is out of the scope of the disclosure and thus, its detailed description is omitted.

One cluster is composed of one cluster header and several cluster members. For example, in the first cluster, the MS 100 becomes a cluster header, and the MSs 102, 104, and 106 become cluster members. In the second cluster, the MS 110 becomes a cluster header, and the MSs 106 and 108 become cluster members. Here, the MS 106 is included in both the first cluster and the second cluster, and a role of the MS 106 is described in detail in FIG. 6.

The cluster headers 100 and 110 have authorities to schedule and control all data generated in their own clusters. For example, the cluster headers 100 and 110 periodically broadcast preamble signals or beacon signals 120 to manage new cluster members and existing cluster members. Further, by managing and broadcasting (130) neighbor cluster member lists (Neighbor List), the cluster headers 100 and 110 share information of MSs within the first and second clusters. So, the cluster members can refer to the MS information at the time of direct transmission (e.g., Peer-To-Peer (P2P) communication).

The cluster members obtain the approval of the cluster header before attempting communication and then, the cluster members perform a communication service. For example, the cluster member 102 (i.e., the source MS) competitively forwards (140) its own transmission request message to the cluster header 100 using a control channel. In detail, in an example where the cluster member 102 receives the neighbor cluster member list (Neighbor List) including Global Positioning System (GPS) information from the cluster header 100, the cluster member 102 can send (140) a transmission request to the cluster header 100 in consideration of its own transmission range and a location of the cluster member 106 (i.e., the target MS).

According to scheduling performance or non-performance of the cluster header 100, the cluster member 102 obtains either direct approval, or indirect approval through a control message (e.g. UL_MAP or DL_MAP), from the cluster header 100. That is, the cluster header 100 broadcasts (150) a transmission response message for the transmission request of the cluster member 102. After that, the cluster member 102 attempts (160) communication using a designated wireless resource.

Particularly, the cluster Member 106 listening to two or more preamble signals (or beacon signals) can be a gateway MS for connecting two clusters as one. The gateway MS is described in detail in FIG. 6.

Figure 2:
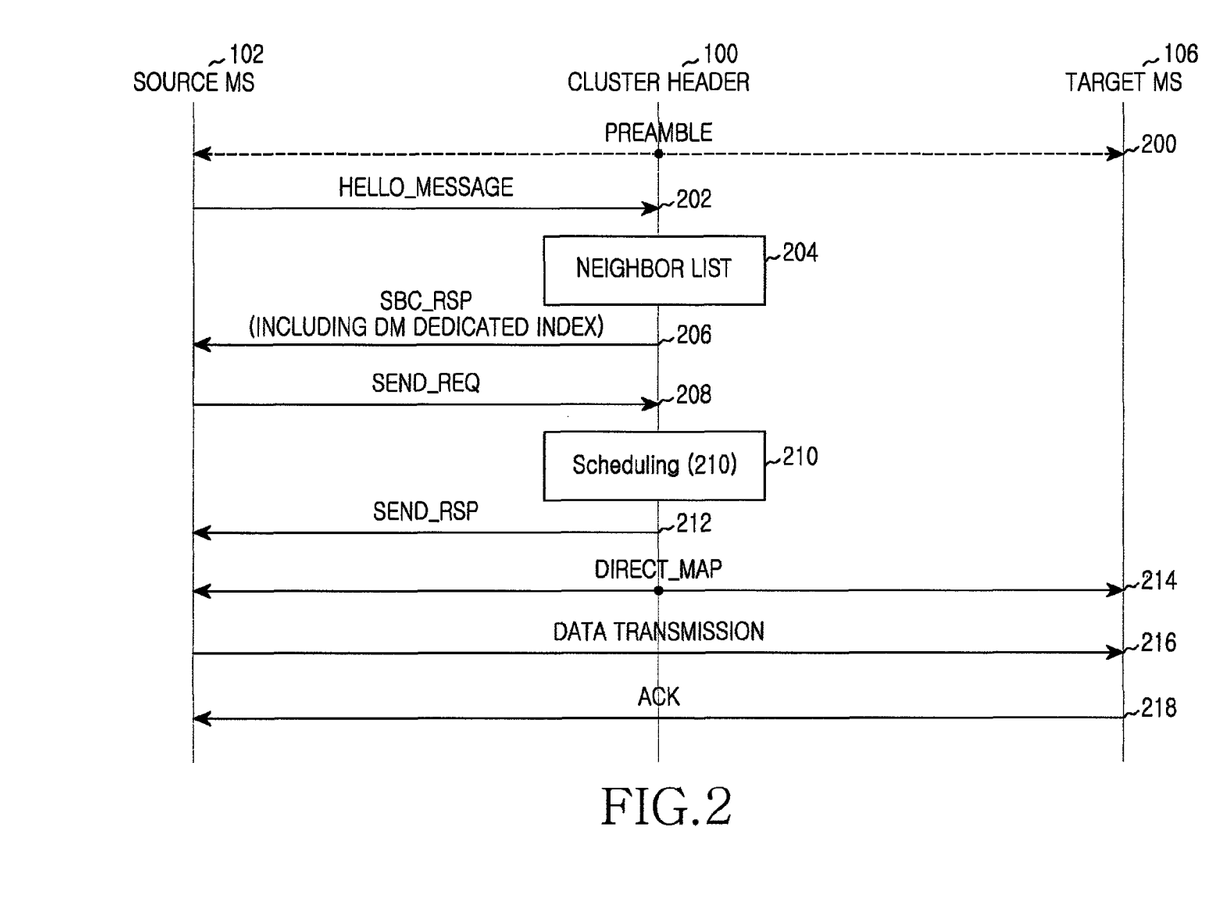
FIG. 2 is a ladder diagram illustrating a signal flow for communication connection while a BS providing a communication service to a plurality of MSs within service coverage is disrupted in a broadband wireless communication system according to a first exemplary embodiment of the present disclosure.

FIG. 2 illustrates a signal flow for communication connection while a BS providing a communication service to a plurality of MSs within service coverage is disrupted in a broadband wireless communication system according to a first exemplary embodiment of the present disclosure. It is assumed that a source MS 102 and a target MS 106 are cluster members. Here, it is assumed that a cluster header 100 has a scheduling function.

Referring to FIG. 2, when communication with a BS is interrupted, in step 200, the cluster header 100 periodically broadcasts a preamble message, which is selected among an arbitrary preamble set, during a constant time to construct a cluster itself.

After the source MS 102 receives the preamble message during the constant time from the cluster header 100, in step 202, the source MS 102 sends a Hello_Message for cluster member subscription to the cluster header 100. Although not illustrated, the target MS 106 also receives a preamble message during a constant time from the cluster header 100 and then, sends a Hello_Message to the cluster header 100. A Hello_Message format proposed in the present disclosure is given according to Table 1 below.

TABLE 1

| Syntax | Size | Notes |
|---|---|---|
| Hello_Message Format( ){ | | |
| MAC Address | 48 | |
| Hello Type | 1 | 0: Normal Hello 1: Gateway Hello |
| Location Information (option) | TBD | |
| } | | |

Here, the Hello_Message includes a Media Access Control (MAC) address, a Hello Type indicating an MS's own current state, and optional Global Positioning System (GPS) location information of an MS. The MAC address is an inherent identifier of each MS intending to become a cluster member. Here, if Hello Type=1, the Hello Type indicates that an MS is a gateway in an example where the MS receives two or more preambles and, if Hello Type=0, the Hello Type indicates new cluster member subscription.

After that, in step 204, the cluster header 100 makes a neighbor cluster member list (Neighbor List) based on information included in the Hello_Message that is received from the cluster member 102 after preamble transmission. And, although not illustrated, the cluster header 100 periodically broadcasts the made neighbor cluster member list (Neighbor List). Accordingly, the cluster members 102 and 106 can identify information of other cluster member MSs included within a cluster.

Next, in step 206, in response to the Hello_Message, the cluster header 100 sends a response message (i.e., an SBC-RSP (Subscriber Station (SS) Basic Capability Response) message or Member Entry_CFM (Confirm) message) to the source MS 102. In other words, the cluster header 100 sends the Member Entry_CFM message proposed in the present disclosure to the source MS 102 to approve cluster entry of the cluster member (i.e., the source MS 102). A Member Entry_CFM Message format is given according to Table 2 below.

TABLE 2

| Syntax | Size | Notes |
|---|---|---|
| Member Entry CFM Message Format (){ | | |
| MAC Address | 48 | |
| Confirm Code | 2 | 00: OK 01: Reject 02: Merge Ready |
| Direct Mode SBC Index | | |
| If (Confirm code == 02) { Number of Cluster members } } | | |

Here, the 'MAC address' is an inherent identifier of an MS approved as a cluster member. In an example where other identifiers exist, the 'MAC address' is replaceable. The 'Confirm Code' indicates approval or non-approval, and the 'Direct Mode SBC index' indicates selective application of a universal capability (e.g., a Modulation and Coding Scheme (MCS) level and the like) predefined for a direct mode. By receiving the Member Entry_CFM message, a member MS within a cluster can briefly complete a network entry process applied in the existing IEEE 802.16. Afterward, a security process can be added but is not handled in the present disclosure.

After the cluster member subscription is completed, in an example where the source MS 102 desires data transmission, in step 208, the source MS 102 sends a Send_REQ message proposed in the present disclosure based on the neighbor cluster member list (Neighbor List), to the cluster header 100. A Send_REQ message format is given according to Table 3 below.

TABLE 3

| Syntax | Size | Notes |
|---|---|---|
| Send_REQ Message Format(){ Source MAC Address Destination MAC Address QoS parameter Data Slot (option) | 48 | |

After receiving the Send_REQ message, in step 210, the cluster header 100 performs scheduling based on source MS and target MS information, a Quality of Service (QoS) parameter and the like.

Next, in step 212, the cluster header 100 sends a response message (Send_RSP) in response to the Send_REQ message.

After that, by transmitting scheduling information through a Direct_MAP in step 214, the cluster header 100 can allow each cluster member to identify a position and amount of a resource allocated to itself. The MAP structure uses the same method as the existing IEEE 802.16 standard structure.

Next, in step 216, the source MS 102 transmits data to the target MS 106 using a resource allocated to itself.

After that, in step 218, the target MS 106 monitors the resource allocated to the source MS 102, receives data from the source MS 102, and then sends an ACKnowledgement (ACK) message for the received data to the source MS 102.

Figure 3:
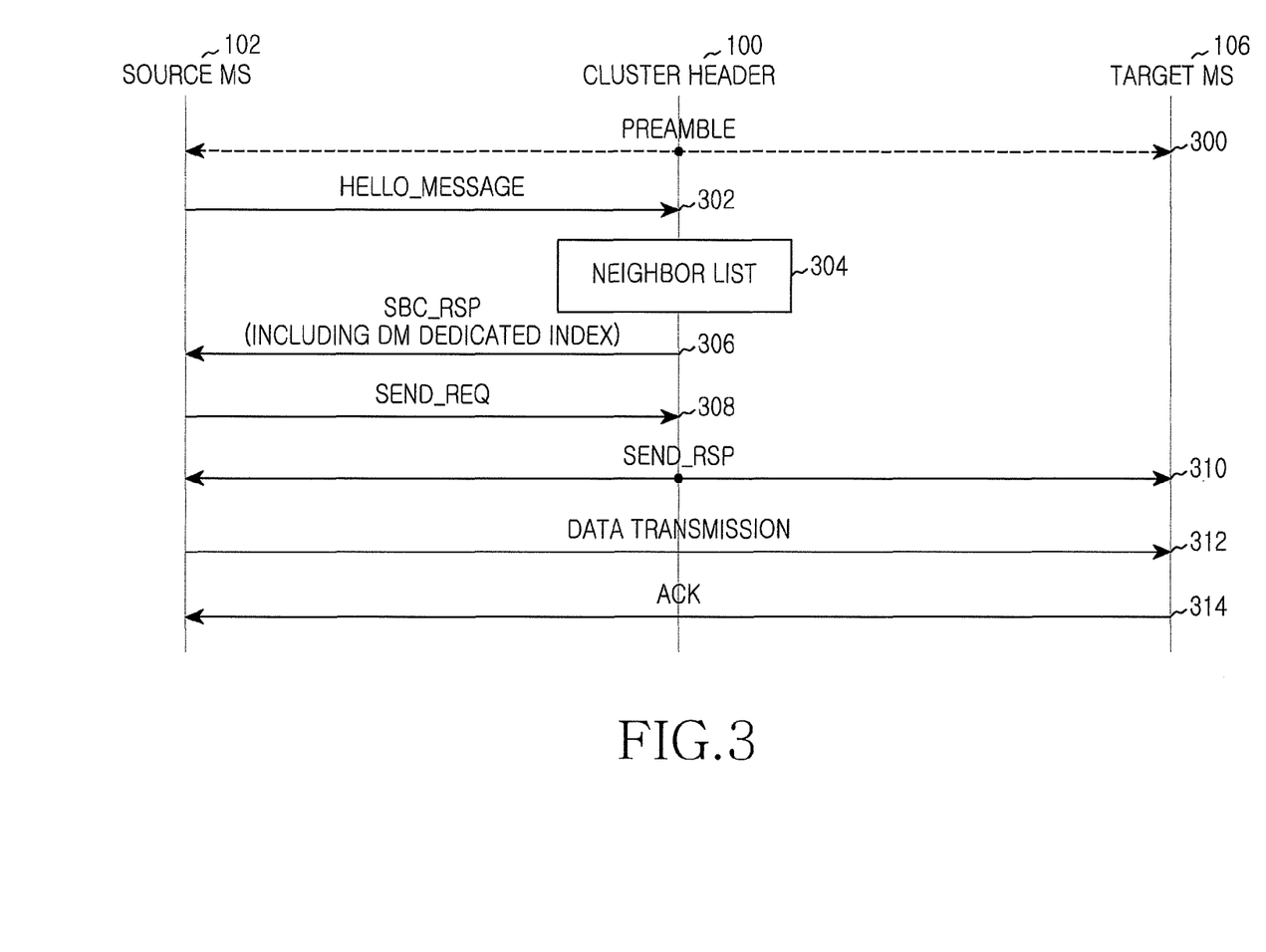
FIG. 3 is a ladder diagram illustrating a signal flow for communication connection while a BS providing a communication service to a plurality of MSs within service coverage is disrupted in a broadband wireless communication system according to a first exemplary embodiment of the present disclosure.

FIG. 3 illustrates a signal flow for communication connection while a BS providing a communication service to a plurality of MSs within service coverage is disrupted in a broadband wireless communication system according to a first exemplary embodiment of the present disclosure. It is assumed that a source MS 102 and a target MS 106 are cluster members. Here, it is assumed that a cluster header 100 has no scheduling function.

Referring to FIG. 3, when communication with a BS is interrupted, in step 300, the cluster header 100 periodically broadcasts a preamble message, which is selected among an arbitrary preamble set, during a constant time to construct a cluster itself.

After the source MS 102 receives the preamble message during the constant time from the cluster header 100, in step 302, the source MS 102 sends a Hello_Message for cluster member subscription to the cluster header 100. Although not illustrated, the target MS 106 also receives a preamble message during a constant time from the cluster header 100 and then, sends a Hello_Message (referring to Table 1 above) to the cluster header 100.

After that, in step 304, the cluster header 100 makes a neighbor cluster member list (Neighbor List) based on information included in the Hello_Message that is received from the cluster member 102 after preamble transmission. And, although not illustrated, the cluster header 100 periodically broadcasts the made neighbor cluster member list (Neighbor List). Accordingly, the cluster members 102 and 106 can identify information of other cluster member MSs included within a cluster.

Next, in step 306, in response to the Hello_Message, the cluster header 100 sends a response message (i.e., an SBC-RSP (Subscriber Station (SS) Basic Capability Response) message or Member Entry_CFM (Confirm) message) to the source MS 102. In other words, the cluster header 100 sends the Member Entry_CFM message (referring to Table 2 above) proposed in the present disclosure to the source MS 102 to approve cluster entry of the cluster member (i.e., the source MS 102).

After the cluster member subscription is completed, in an example where the source MS 102 desires data transmission, in step 308, the source MS 102 sends a Send_REQ message (referring to Table 3 above) proposed in the present disclosure to the cluster header 100.

After that, because the cluster header 100 cannot perform scheduling, in step 310, the cluster header 100 broadcasts a Send_RSP message proposed in the present disclosure within a cluster managed by itself. A Send_RSP message format is given according to Table 4 below.

TABLE 4

| Syntax | Size | Notes |
|---|---|---|
| Send_RSP Message Format(){ Source MAC Address Destination MAC Address Confirm Code Reserved Slot } | 48 | |

The Send_RSP message is broadcasted through a control channel. Generally, all cluster members are designed to monitor the control channel and thus, can receive the Send_RSP message from the cluster header 100. When the cluster member decodes the Send_RSP message, if the cluster member becomes a target MS itself, the cluster member (i.e., the target MS) identifies a reserved slot with a source MS and, at the defined slot, gets ready for receiving transmission. In an example where the source MS 102 receives a confirm code as a rejection from the cluster header 100, the source MS 102 determines that collision with other MS takes place, so the source MS inserts other slot and again sends a Send_REQ message to the cluster header 100. All cluster members record a reserved slot and, when the cluster members use Send_REQ messages themselves, the cluster members determine interference or non-interference based on their location information to select a slot.

In other words, if a scheduler does not exist, the cluster header 100 determines if a data slot required by the source MS 102 is an available slot. If the data slot is pre-occupied or is unavailable, the cluster header 100 notifies the source MS 102 and leads the source MS 102 to set a new slot. The data slot operates in a Frame Slotted Aloha scheme and is selected through random selection.

After that, in step 312, the source MS 102 attempts transmission to a target MS 106 at the reserved slot. After transmission completion, in step 314, the source MS 102 directly receives a forward of an ACK message and identifies the transmission completion. In an example where the source MS 102 does not finish the transmission within the reserved slot, the source MS 102 newly competes with other MSs and once more reserves a resource slot.

Figure 4:
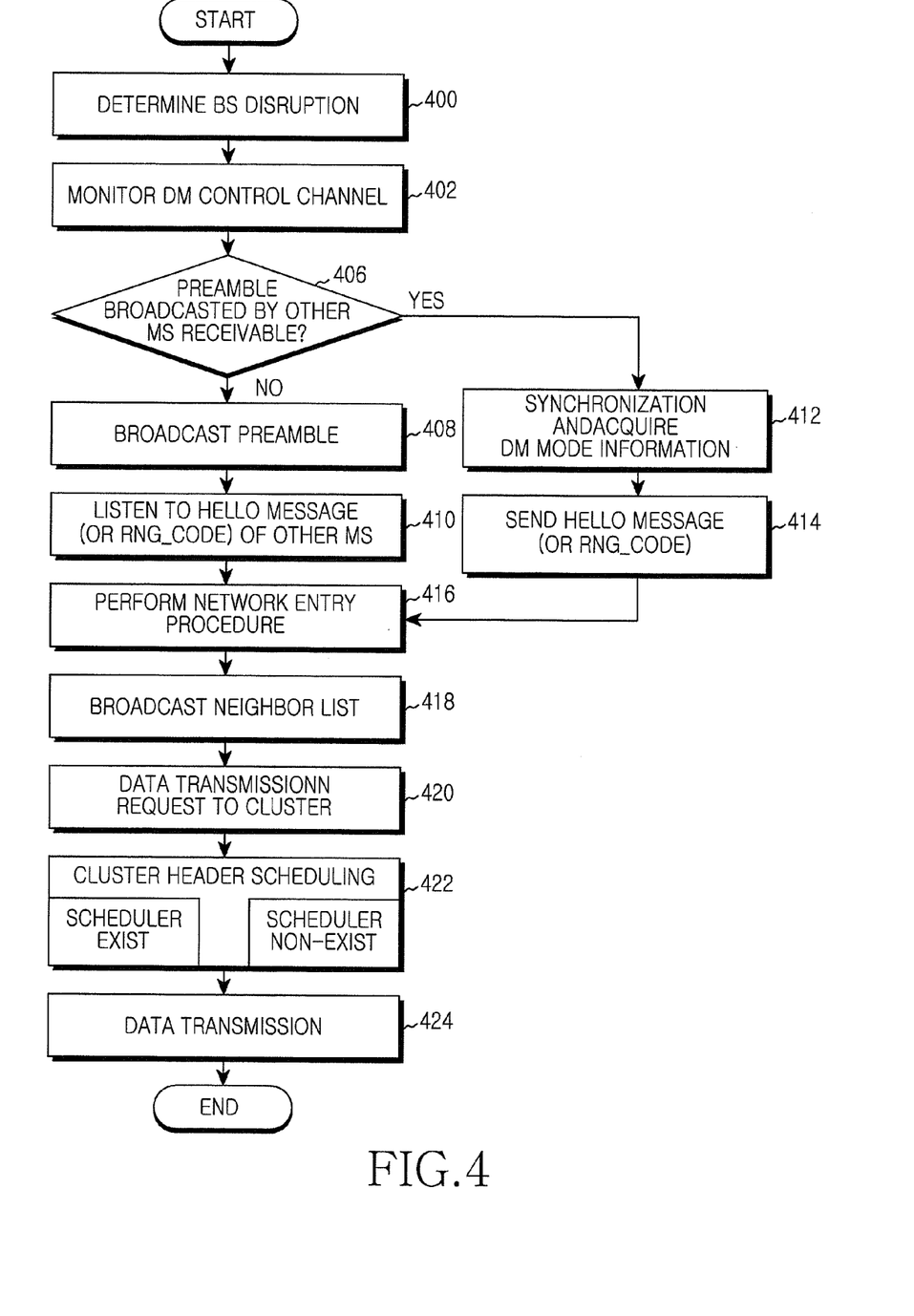
FIG. 4 is a flowchart illustrating a signal flow for communication connection while a BS providing a communication service to a plurality of MSs within service coverage is disrupted in a broadband wireless communication system according to a first exemplary embodiment of the present disclosure.

FIG. 4 illustrates a signal flow for communication connection while a BS providing a communication service to a plurality of MSs within service coverage is disrupted in a broadband wireless communication system according to a first exemplary embodiment of the present disclosure.

Referring to FIG. 4, when it is determined in step 400 that connection with a BS is interrupted, a cluster member gets ready for executing an algorithm proposed in the present disclosure. As a criterion by which an MS determines that the connection with the BS is interrupted, various methods exist and are not handled in the present disclosure.

In step 402, the cluster member monitors a predefined Direct Mode (DM) dedicated control channel during a given time.

If the cluster member cannot listen to any message or a preamble signal and the like from the neighbors in step 406, the cluster member proceeds to step 408 and broadcasts a preamble signal. That is, the cluster member not receiving any message or preamble signal from the neighbors performs a role of a cluster header and broadcasts a preamble signal to attempt connection with other cluster members.

And, the cluster member proceeds to step 410 and listens to a Hello message or ranging code (RNG_Code) from other cluster members.

In contrast, if receiving any message or preamble signal from the neighbors in step 406, the cluster member proceeds to step 412 and performs synchronization using the received preamble signal and acquires physical information (e.g., a resource position, a DownLink/UpLink (DL/UL) time and the like) used in a DM mode. And, in step 414, the cluster member sends a Hello message (or RNG_Code) to a cluster header having broadcasted a preamble signal.

Next, if the preamble signal is received, in step 416, the cluster member informs the cluster header of its own existence and performs a cluster entry procedure. Ranging can be automatically adjusted based on the preamble signal broadcasted by the cluster header, or adjusted through a ranging procedure in an IEEE 802.16m system.

After that, in step 418, the cluster header configures a neighbor cluster member list (Neighbor List) based on Hello messages transmitted by cluster members and broadcasts the neighbor cluster member list (Neighbor List) to its own cluster members. The cluster header broadcasts the neighbor cluster member list (Neighbor List) to the cluster members, so the cluster member can be aware of information of other cluster members.

Next, after the cluster entry is completed, in step 420, the cluster member desiring data transmission sends a data transmission request to the cluster header. In other words, in an example where there is data to be transmitted, the cluster member competitively accesses the cluster header and receives a permission for transmission or non-transmission.

After that, in step 422, in an example where the cluster header receives the transmission request from the cluster member, if a scheduler exists, the cluster header schedules a resource itself and allocates the scheduled resource to a previously designated data channel. Resource allocation information is forwarded to cluster members within a cluster that the cluster header manages itself through a MAP. In contrast, if a scheduler does not exist, the cluster header transmits a resource reservation permission within the cluster such that other cluster members listen to the resource reservation permission in order for the cluster members not to use a reserved resource.

Next, in step 424, the cluster member transmits data using a corresponding data slot or wireless resource.

Figure 5:
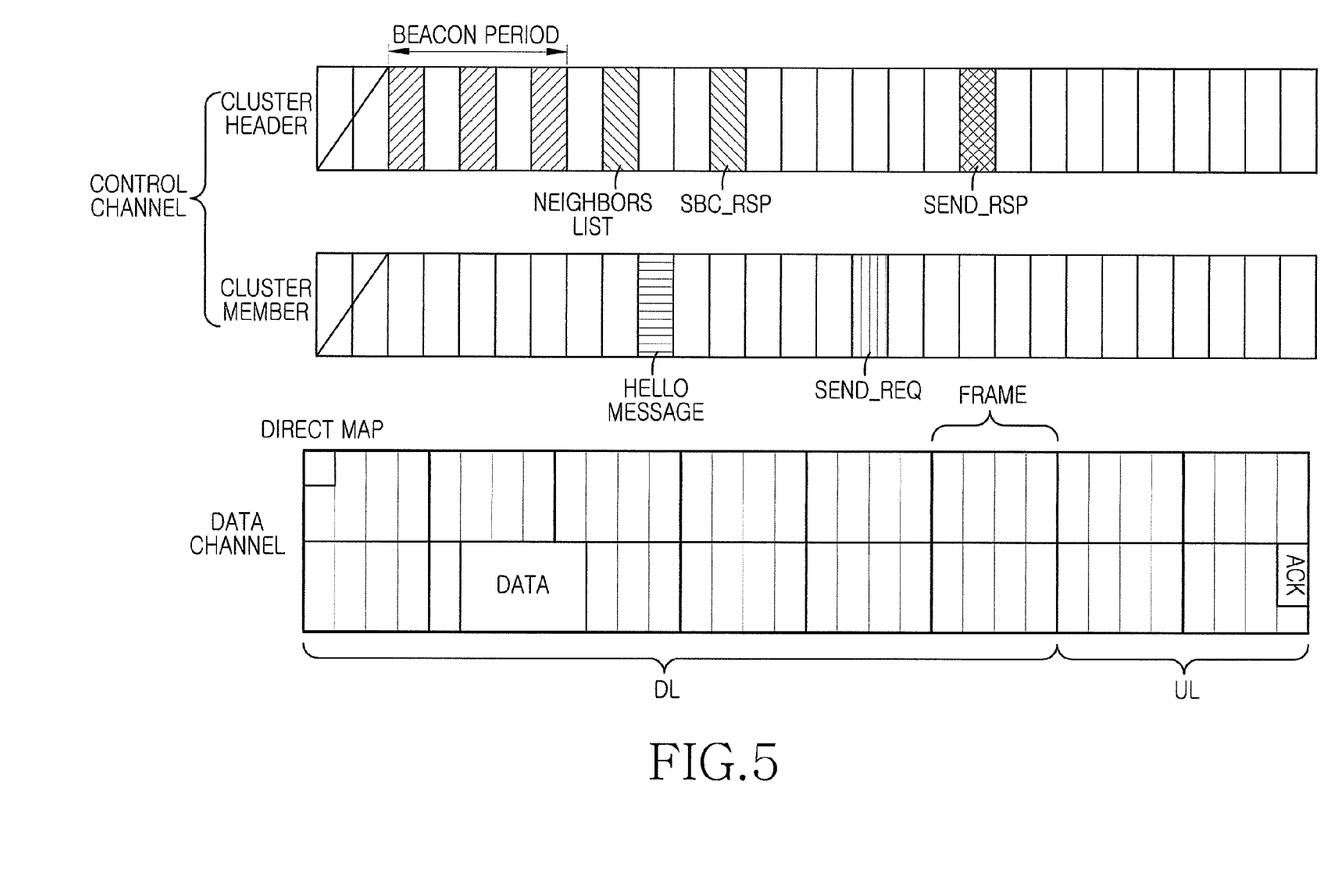
FIG. 5 is a diagram illustrating an example of resource allocation in a broadband wireless communication system according to an exemplary embodiment of the present disclosure.

FIG. 5 illustrates an example of resource allocation in a broadband wireless communication system according to an exemplary embodiment of the present disclosure.

Referring to FIG. 5, a resource is divided into a control channel and a data channel and is managed. At this time, the control channel and data channel can be divided into a frequency or time.

The control channel can be composed of a single channel or a multi channel. The control channel is designed in a Time Division Multiple Access (TDMA) scheme and, basically, MSs performing direct communication (or P2P communication) share the control channel.

A constant interval of the control channel is allocated for preamble or beacon transmission. During this interval, no message excepting a preamble signal is sent in any control channel. If a cluster header transmits a preamble or beacon signal, neighbor MSs (or cluster members) listen to this preamble or beacon signal, tune synchronization, and get ready for clustering. Basically, the preamble signal can be arbitrarily selected and used among a preamble set used in the IEEE 802.16m. If preamble transmission is completed, the cluster header just transmits a neighbor cluster member list (Neighbor List). Through the neighbor cluster member list (Neighbor List), cluster members can identify address and location information of other cluster members within a current cluster. A Neighbor List message format is given according to Table 5 below. Here, a position of sending a Neighbor List can be different according to a system.

TABLE 5

| Syntax | Size | Notes |
|---|---|---|
| Neighbor List Message Format( ){ | | |
| Number of neighbors | 24 | |
| } | | |

At other time slots accepting a time slot designated by a preamble, all cluster members occupy the time slots in a competition scheme and transmit a control message.

If there is no response from the cluster header after transmitting the control message to the cluster header at the defined time slot based on random backoff, the lack of response is regarded as collision, and the cluster members again increase a backoff counter and occupy a time slot. Because backoff expires, in an example where an MS intending to become a cluster member sends a Hello Message at a specific time slot, in response to this, the cluster header clusters the MS. After that, if there is a data transmission request from the cluster member, the cluster header also sends a response for the data transmission request and, if a scheduler exists, the cluster header allocates a resource through MAP information or, if no scheduler exists, the cluster header reserves a slot using a response message. In addition, because all MSs are designed to listen to a control channel at an idle time, a system is designed to guarantee a slot for a cluster header to send a response message in an example where the MSs listen to a control message sent to the cluster header.

The data channel is designed identically with that of the existing IEEE 802.16 system. The data channel is composed of a DL channel and a UL channel. At the first of a frame, a MAP is transmitted to inform DL and UL resource information that an MS will use. DL and UL resource allocation is different depending on a system, and is generally constructed in an asymmetric type. The DL resource is used for transmission from a source MS to a target MS. In contrast, a UL resource is used for transmission from a target MS to a source MS or a cluster header. The data channel is managed independently from the control channel but the data channel and the control channel are synchronized with each other. In contrast, in an example where a scheduler of a cluster header of an SBC index within a Member Entry CFM message does not exist, DL and UL channels are managed in a Frame Slotted Aloha scheme and are reserved with a 2-dimensional address through random selection.

If a network begins to be restored through clustering in a BS disruption area based on an algorithm proposed in the present disclosure, because a transmit power of an MS is less than a transmit power of a BS, clusters are sporadically formed within the coverage of a BS and the completed clusters operate independently. In other words, to recover the coverage when the BS is activated, organic communication between clusters may be needed. Accordingly, in FIGS. 6 to 8, a gateway mechanism is proposed.

Figure 6:
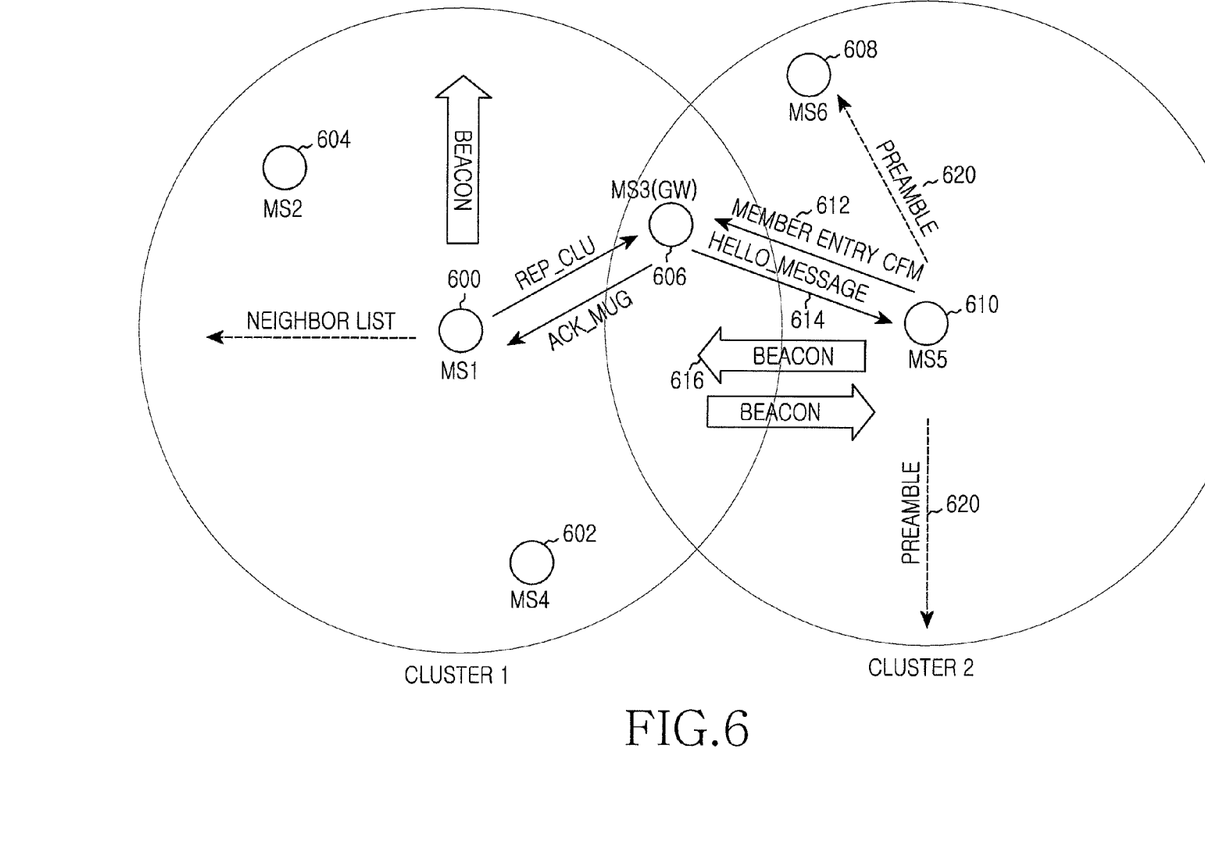
FIG. 6 is a diagram illustrating the scenario of gateway construction for connection among a plurality of clusters formed due to disruption of a BS providing a service in a broadband wireless communication system according to a second exemplary embodiment of the present disclosure.

FIG. 6 illustrates the scenario of gateway construction for connection among a plurality of clusters formed due to disruption of a BS providing a service in a broadband wireless communication system according to a second exemplary embodiment of the present disclosure.

Referring to FIG. 6, it is assumed that, while a BS (not shown) providing a communication service to MSs 600 to 610 is disrupted, a first cluster and a second cluster are constructed. In the first cluster, the MS 600 becomes a cluster header and MSs 602, 604, and 606 become cluster members. In contrast, in the second cluster, the MS 610 becomes a cluster header, and the MSs 606 and 608 become cluster members.

In this exemplary embodiment, in an environment where the first cluster and the second cluster overlap with each other and thus the MS 606 receives two or more preamble signals, the MS 606 performs a gateway role and the first cluster and the second cluster are merged.

A procedure for setting the MS 606 to a gateway is described. The MS 606 is constructed as one cluster member within a cluster area in which the first cluster and the second cluster overlap with each other. Accordingly, the MS 606 changes its own role of a general cluster member. That is, in an example where the MS 606 listens to a preamble from the second cluster after being constructed as a cluster member of the first cluster, the MS 606 reports this to the cluster header 600 to inquire an intention of merging the first cluster and the second cluster. The MS 606 receives a response from the first cluster header 600, and introduces itself as the gateway to the second cluster header 610 that is broadcasting (616) a preamble signal, and attempts (614) access to the second cluster header 610. The second cluster header 610 transmits (612) information of a cluster member managed by itself to the MS 606 so as to merge with the first cluster through the gateway. The MS 606 compares information of the first cluster including itself at first and the second cluster newly including itself to determine a main cluster. For instance, the MS 606 can determine the main cluster by comparing signal intensities of the first cluster header 600 and the second cluster header 610 or determine the first cluster as the main cluster by putting priority on the first cluster first including the MS 606 to perform a gateway role. Or, the MS 606 can determine the main cluster by comparing the number of cluster members included in each cluster.

After the MS 600 requires a function stop for the second cluster header 610 designated as a sub cluster, the MS 600 determined as the gateway broadcasts (620) a preamble signal of the main cluster to perform synchronization. After the synchronization is finished, the sub cluster resumes a function and sends a message to the MS 606. Like the previous, cluster members of the sub cluster resume communication through the cluster header 610. A communication control of the sub cluster is transmitted to the main cluster header 600 through the gateway, and the first cluster (i.e., the main cluster) and the second cluster (i.e., the sub cluster) complete a merger work.

Accordingly, a virtual backhaul is generated according to the cluster headers 600 and 610 and the gateway MS 606. This is used for stably restoring a disrupted network. Further, the gateway forms an upper layer of a cluster header, and can consolidate overlayering as a new cluster header.

In other words, some or all of cluster members that one cluster header takes charge of can move to other cluster headers through the gateway. Here, connection between the cluster headers is called a virtual backhaul.

Also, a plurality of cluster headers connect with each other as one layer through a gateway, and another layer in which a representative gateway among a plurality of gateways controls remnant gateways can be formed. Here, gathering a plurality of cluster headers to form one layer, and gathering gateways connecting the plurality of cluster headers to form an upper layer is called overlayering.

Figure 7:
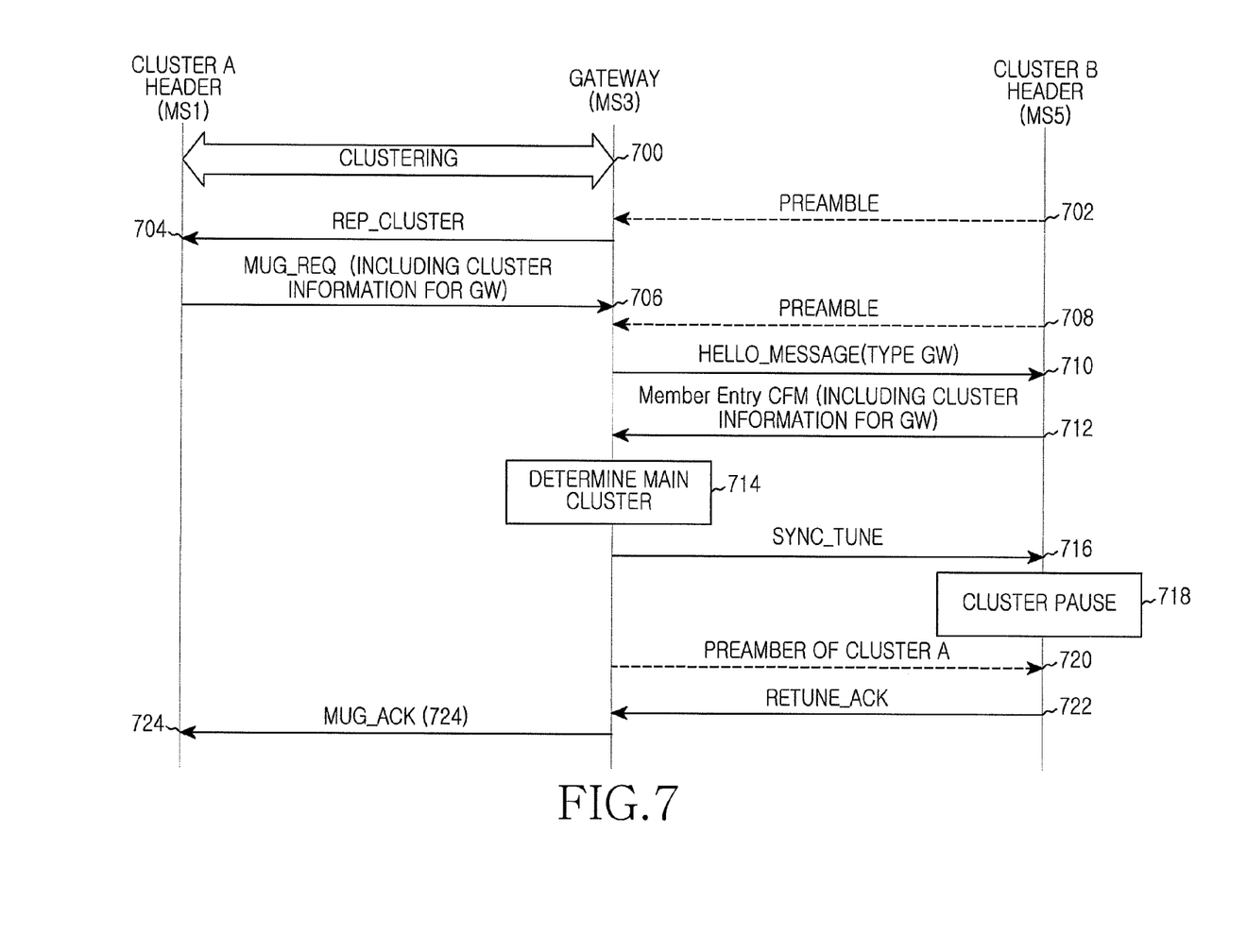
FIG. 7 is a ladder diagram illustrating a signal flow for connection among a plurality of clusters formed due to disruption of a BS providing a service in a broadband wireless communication system according to a second exemplary embodiment of the present disclosure.

FIG. 7 illustrates a signal flow for connection among a plurality of clusters formed due to disruption of a BS providing a service in a broadband wireless communication system according to a second exemplary embodiment of the present disclosure.

Here, in step 700, a gateway MS performs clustering with a cluster A header (MS1) and, in steps 702 and 708, the gateway MS receives a preamble signal broadcasted by a cluster B header (MS5).

Next, after the gateway MS completes clustering with cluster members of a cluster A, when receiving a new preamble signal from a cluster B, in step 704, the gateway MS sends a REP_Cluster message to the cluster A header, A REP_Cluster message format is given according to Table 6 below.

TABLE 6

| Syntax | Size | Notes |
| --- | --- | --- |
| REP Cluster Message Format( ){ Number of listened preamble For(i=0; i<Numberoflistenedpreamble; i++) { Preamble Label Signal Power level Reserved } Padding } | 6 1 TBD | |

The gateway MS labels and distinguishes the received preamble signals different from each other, through the REP_Cluster message, measures receive power of the different preamble signals, and transmits the measured receive power together, thereby expanding/maintaining a cluster.

After that, in step 706, the cluster A header determines priorities of clusters to be merged based on information included in the REP_Cluster message and sends a MUG_REQ message to the gateway MS. A MUG_REQ message format is given according to Table 7 below.

TABLE 7

| Syntax | Size | Notes |
| --- | --- | --- |
| MUG REQ Message Format( ){ Preamble label Number of cluster members Reserved } | 6 | |

The cluster A header selects the cluster B desiring merger through a preamble label and forwards the number of MSs currently included in the cluster A (or the number of members of the cluster A) to the gateway MS, such that the gateway MS considers the number of MSs at the time of selecting a main cluster.

Next, in step 710, the gateway MS receiving the MUG_REG message sets the type of a Hello_Message as "Gateway" and sends the Hello_Message to the cluster B header.

After that, in step 712, if intending to merger with the cluster A, the cluster B header sets a Confirm Code to '02: Merge Ready', includes members of the cluster A, and responds by a Member Entry CFM Message. If the merger is rejected, the cluster B header responds by a '01: Reject' message.

Next, in step 714, the gateway MS determines a main cluster based on the number of cluster members obtained in the cluster A header and the cluster B header. In an example of tuning synchronization, it takes a long time for a cluster including many MSs to vary, so the cluster including many members is set to the main cluster, and a cluster less in number is set to a sub cluster.

After that, in step 716, the gateway MS sends a Sync_Tune message to the sub cluster (i.e., cluster B) header and commands a sub cluster to tune synchronization with the main cluster (i.e., the cluster A).

Next, in step 718, the sub cluster (i.e., cluster B) header receiving the Sync_Tune message stops all operations within the sub cluster, and broadcasts the Sync_Tune message to its own members of the sub cluster to set new synchronization (not shown).

After that, in step 720, the gateway MS simultaneously broadcasts a preamble signal 720 of the main cluster at a predefined interval such that the sub cluster header (i.e., the cluster B header) tunes synchronization, and the sub cluster header broadcasts the received preamble signal of the main cluster to members of the cluster B to attempt re-synchronization.

Next, if the synchronization is completed, in step 722, the sub cluster header sends a Retune_ACK message to the gateway MS. In step 724, the gateway MS sends a MUG_ACK message to the main cluster header to make the main cluster identify that merger has been completed.

Figure 8:
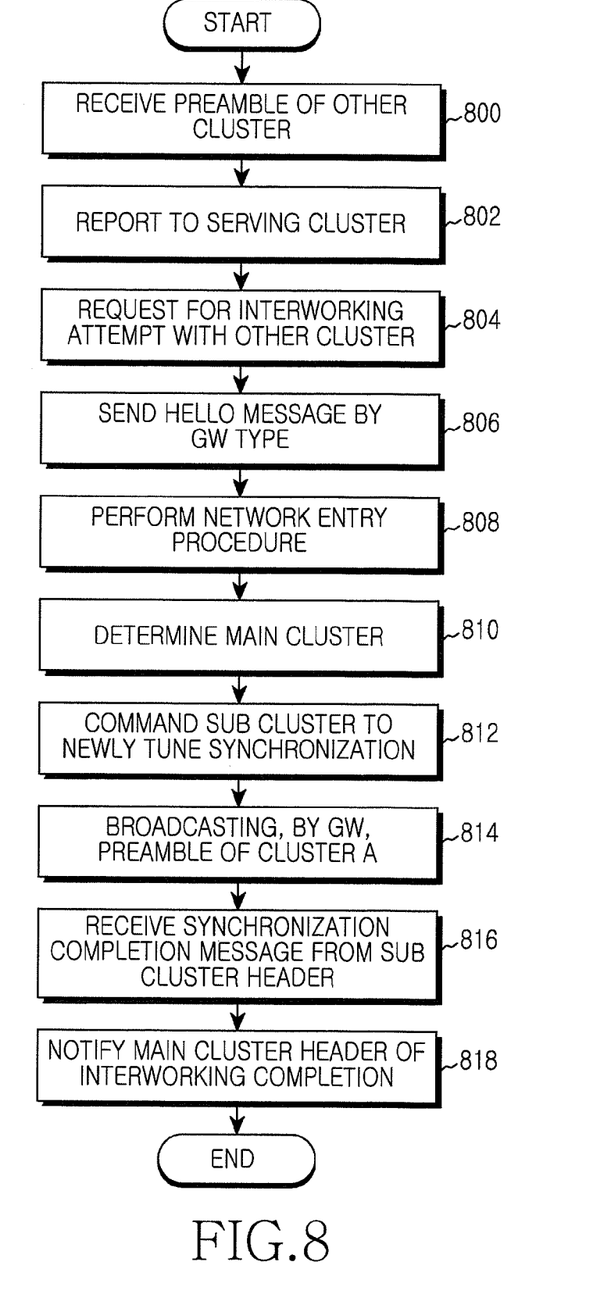
FIG. 8 is a flowchart illustrating a process of connection among a plurality of clusters formed due to disruption of a BS providing a service in a broadband wireless communication system according to a second exemplary embodiment of the present disclosure.

FIG. 8 illustrates a process of connection among a plurality of clusters formed due to disruption of a BS providing a service in a broadband wireless communication system according to a second exemplary embodiment of the present disclosure.

Referring to FIG. 8, in step 800, an MS (i.e., a gateway MS) located in an area where at least two or more clusters are overlapped listens to a control channel besides its own transmission interval.

At this time, in step 802, if receiving a preamble signal of a different pattern through the control channel, the gateway MS reports this to a serving cluster. That is, the gateway MS recognizes the existence of another cluster, and reports this to the serving cluster to attempt cluster merger for coverage enlargement.

Next, in step 804, a header of the serving cluster sends a merger attempt message to the gateway MS together with its own cluster member information. At this time, the gateway MS gets ready for operating as a gateway.

After that, in step 806, the gateway MS sends a Hello Message set to a gateway type to a cluster header (i.e., a target cluster header) being transmitting a new preamble signal, to inform the cluster header of cluster merger.

Next, in step 808, the gateway MS performs a network entry procedure with the target cluster header and acquires target cluster information from the target cluster header.

After that, in step 810, the gateway MS determines a main cluster on based on information of the serving cluster and the target cluster. For example, the gateway MS determines, as a main cluster, a cluster difficult to vary because the 1 number of cluster members is large. Also, the main cluster generally has initiative of synchronization and control.

Next, if the main cluster is determined, in step 812, the gateway MS commands a header of a sub cluster to tune synchronization to the main cluster.

After that, in step 814, the header of the sub cluster broadcasts a new synchronization command to its own members of the sub cluster and stops all communication. At this time, the gateway MS broadcasts preamble information of the main cluster and provides synchronization to the header of the sub cluster.

Next, the header of the sub cluster again broadcasts received preamble information of the main cluster to its own members although not illustrated.

After that, in step 816, if cluster members included in the sub cluster complete the synchronization, the gateway MS receives a synchronization completion message from the sub cluster.

Next, in step 818, the gateway MS notifies the header of the main cluster of cluster merger or interworking completion.

Accordingly, the gateway MS performs a role of a gateway connecting the header of the main cluster with the header of the sub cluster.

In the present disclosure, one MS is considered in an area where clusters are overlapped, but a plurality of MSs can exist. In an example where the plurality of MSs exist, any one of the plurality of MSs can be selected and perform a gateway role as a representative.

According to another exemplary embodiment, a plurality of MSs may all perform a gateway role in an area where clusters are overlapped.

Figure 9:
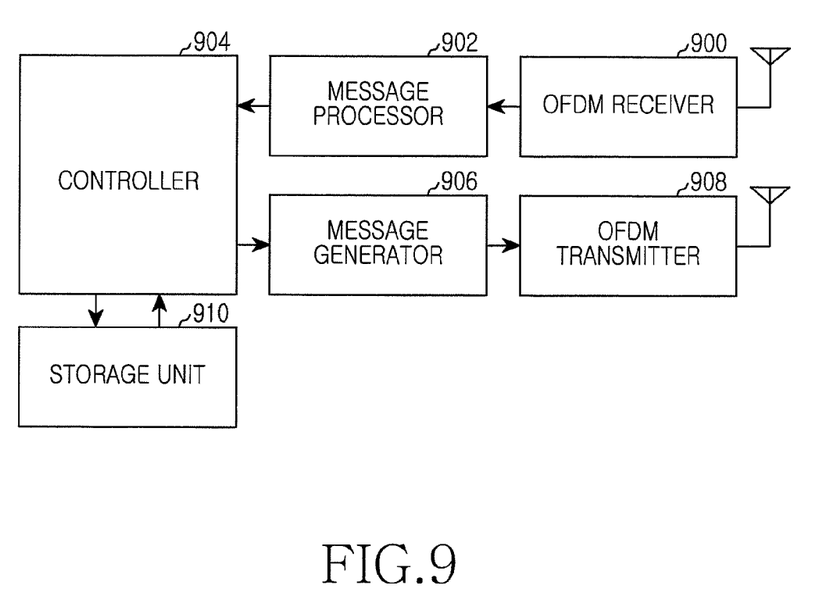
FIG. 9 is a block diagram illustrating an MS apparatus for data communication while a BS is disrupted in a broadband wireless communication system according to an exemplary embodiment of the present disclosure.

FIG. 9 illustrates an MS apparatus for data communication while a BS is disrupted in a broadband wireless communication system according to an exemplary embodiment of the present disclosure.

Referring to FIG. 9, the apparatus includes an Orthogonal Frequency Division Multiplexing (OFDM) receiver 900, a message processor 902, a controller 904, a message generator 906, an OFDM transmitter 908, and a storage unit 910.

The OFDM receiver 900 converts a Radio Frequency (RF) signal received through an antenna into a baseband analog signal, and converts the analog signal into sample data. Further, the OFDM receiver 900 processes the sample data by Fast Fourier Transform (PET) to convert the sample data into frequency domain data, and selects and outputs data of subcarriers actually intended for reception. And, the OFDM receiver 900 demodulates and decodes the data according to a predefined modulation level (i.e., an MCS level) and outputs the data to the message processor 902.

The message processor 902 analyzes a control message (i.e., a Hello_Message, an SBC_RSP, a Send_REQ, a Send_RSP, a REP_Cluster, a MUG_REQ and the like) input from the OFDM receiver 900 and provides the result to the controller 904. The controller 904 performs corresponding processing for information from the message processor 902, and also generates information (e.g., a Hello_Message, an SBC_RSP, a Send_REQ, a Send_RSP, a REP_Cluster, a MUG_REQ and the like) to be transmitted and provides the generated information to the message generator 906. The message generator 906 generates a message with various information provided from the controller 904, and outputs the generated message to the OFDM transmitter 908 of a physical layer.

The OFDM transmitter 908 encodes and modulates data from the message generator 906 according to a predefined modulation level (i.e., an MCS level). And, the OFDM transmitter 908 processes a modulated symbol by Inverse Fast Fourier Transform (IFFT) and outputs sample data (i.e., an OFDM symbol). Further, the OFDM transmitter 908 converts the sample data into an analog signal, converts the analog signal into an RF signal, and transmits the RF signal through an antenna.

In the aforementioned construction, the controller 904 is a protocol controller, and controls the message processor 902 and the message generator 906. That is, the controller 904 can perform the functions of the message processor 902 and the message generator 906. These are separately constructed in order to distinguish and describe respective functions in the present disclosure. Thus, in an actual realization, construction can be such that all the functions are processed in the controller 904, or construction can be such that only part of the functions is processed in the controller 904.

Further, the controller 904 receives necessary information by a corresponding constituent part of a physical layer during protocol processing performance, or generates a control signal by a corresponding constituent part of the physical layer. For example, the controller 904 can generate a control signal for controlling a subcarrier allocation scheme (or a subchannel allocation scheme) of the OFDM transmitter 908, or receive reception intensity information (e.g., a Signal to Interference and Noise Ratio (SINR), a Received Signal Strength Indicator (RSSI) and the like) from the physical layer. Particularly, according to the present disclosure, the controller 904 controls operations of the cluster header, cluster member, source MS, and target MS illustrated in FIGS. 1 to 8.

As described above, in a wireless communication system, MSs included in the coverage of a disrupted BS configure clusters and perform direct communication based on a dedicated channel, whereby the MSs can perform communication service even while the BS is disrupted. Further, by setting a gateway between the clusters, a service area of the disrupted BS can be restored.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for data communication while a Base Station (BS) is disrupted in a wireless communication system, the method comprising:
   responsive to a plurality of Mobile Stations (MSs) receiving a preamble signal from a cluster header through a dedicated control channel while the BS is disrupted, transmitting a message requesting cluster member subscription to the cluster header;
   configuring, in a cluster header, a cluster member list, and broadcasting the cluster member list;
   receiving a data transmission request message at the cluster header from a source MS using the broadcasted cluster member list; and
   one of unicasting and broadcasting a response message for the data transmission request of the source MS to a target MS among the plurality of MSs based on the response message.

2. The method of claim 1 further comprising:
   sending an ACKnowledgement (ACK) message for the data transmission to the source MS.

3. The method of claim 1, wherein the message requesting the cluster member subscription comprises at least one of an MS identifier, an indicator determining gateway performance, and location information of an MS.

4. The method of claim 1, wherein the response message for the data transmission request message comprises at least one of an MS identifier, a confirm code informing data transmission approval, and predefined pre-negotiation information.

5. The method of claim 1, wherein the data transmission request message comprises at least one of a source MS identifier, a target MS identifier, a Quality of Service (QoS) parameter, and a data time slot.

6. The method of claim 1, wherein the data transmission request message is transmitted in a competition scheme.

7. The method of claim 1, wherein one of unicasting and broadcasting the response message for the data transmission request of the source MS comprises:
   responsive to the cluster header including a scheduling function, scheduling a resource and allocating the resource scheduled to a predefined data channel; and
   one of unicasting and broadcasting resource allocation information based on a MAP.

8. The method of claim 1, wherein one of unicasting and broadcasting the response message for the data transmission request of the source MS comprises:
   responsive to the cluster header not including a scheduling function, broadcasting a response message comprising a reserved time slot; and in the source MS, transmitting data using the reserved time slot and, in the target MS, getting ready for data transmission from the source MS through the reserved time slot.

9. A gateway determination method for data communication while a Base Station (BS) is disrupted in a wireless communication system, the method comprising:
responsive to a member of a first cluster sensing a preamble signal from a header of a second cluster, inquiring of a header of the first cluster whether to merge with the second cluster;
responsive to the header of the first cluster requesting a merger of the first cluster and second cluster, in the member of the first cluster, transmitting an access request to the header of the second cluster;
responsive to a header of the second cluster permitting the merger of the first cluster and second cluster, transmitting member information of the second cluster to the member of the first cluster;
determining a main cluster based on information on members of the first cluster and information on members of the second cluster; and
performing synchronization based on a synchronization signal of the main cluster.

10. The method of claim 9, wherein performing the synchronization based on the synchronization signal of the main cluster comprises:
in the member of the first cluster, broadcasting a synchronization signal of the main cluster to at least one sub clusters;
in members of a sub cluster, stopping operation and then receiving the synchronization signal of the main cluster;
in the members of the sub cluster, sending a synchronization completion message to the member of the first cluster; and
in the member of the first cluster, receiving the synchronization completion message and notifying the header of the first cluster about cluster merger completion.

11. The method of claim 9, wherein determining the main cluster determines by comparing a number of the members of the first cluster with a number of the members of the second cluster.

12. The method of claim 9, wherein, when the first cluster and the second cluster are merged, the member of the first cluster one of supports that other members of the first cluster move to the second cluster and supports that the members of the second cluster move to the first cluster.

13. The method of claim 9, wherein the member of the first cluster connects the first cluster and the second cluster as a gateway to form a first layer, wherein the member of the first cluster forms a second layer together with other gateways, and wherein the second layer is an upper layer of the first layer.

14. A method for data communication while a Base Station (BS) is disrupted in a wireless communication system, the method comprising:
responsive to receiving a preamble signal from a cluster header through a dedicated control channel while the BS is disrupted, sending a message requesting cluster member subscription to the cluster header;
receiving a cluster member list from the cluster header;
sending a data transmission request message to the cluster header using the cluster member list; and
receiving a response message for the transmission request message from the cluster header, and transmitting data to a target MS.

15. The method of claim 14, further comprising:
receiving an ACKnowledgement (ACK) message for the data transmission, from the target MS.

16. The method of claim 14, wherein the message requesting the cluster member subscription comprises at least one of an MS identifier, an indicator determining gateway performance, and location information of an MS.

17. The method of claim 14, wherein the response message for the data transmission request message comprises at least one of an MS identifier, a confirm code informing data transmission approval, and predefined pre-negotiation information.

18. The method of claim 14, wherein the data transmission request message comprises at least one of a source MS identifier, a target MS identifier, a Quality of Service (QoS) parameter, and a data time slot.

19. The method of claim 14, wherein the data transmission request message is sent in a competition scheme.

20. The method of claim 14, wherein receiving the response message for the transmission request message and transmitting the data to the target MS comprises:
receiving the response message for the transmission request message from the cluster header;
responsive to the cluster header including a scheduling function, receiving resource allocation information; and
transmitting data to the target MS based on the resource allocation information.

21. The method of claim 14, wherein receiving the response message for the transmission request message and transmitting the data to the target MS comprises:
responsive to the cluster header not including a scheduling function, receiving a response message comprising a reserved time slot; and
transmitting data using the reserved time slot.

22. A method for data communication while a Base Station (BS) is disrupted in a wireless communication system, the method comprising:
responsive to broadcasting a preamble signal through a dedicated control channel while the BS is disrupted, receiving a message requesting cluster member subscription from at least one mobile station (MS);
responsive to comprising the at least one MS in the cluster member and constructing and broadcasting a cluster member list, receiving a data transmission request message from a source MS; and
one of unicasting and broadcasting the response message for the data transmission request of the source MS.

23. The method of claim 22, wherein the message requesting the cluster member subscription comprises at least one of an MS identifier, an indicator determining gateway performance, and location information of an MS.

24. The method of claim 22, wherein the response message for the data transmission request message comprises at least one of an MS identifier, a confirm code informing data transmission approval, and predefined pre-negotiation information.

25. The method of claim 22, wherein the data transmission request message comprises at least one of a source MS identifier, a target MS identifier, a Quality of Service (QoS) parameter, and a data time slot.

26. The method of claim 22, wherein the data transmission request message is sent in a competition scheme.

27. The method of claim 22, wherein one of unicasting and broadcasting the response message for the data transmission request of the source MS comprises:

responsive to the cluster member including a scheduling function, scheduling a resource and allocating the resource to a predefined data channel; and one of unicasting and broadcasting resource allocation information based on a MAP.

28. The method of claim 22, wherein one of unicasting and broadcasting the response message for the data transmission request of the source MS comprises:

responsive to the cluster member not including a scheduling function, broadcasting a response message comprising a reserved time slot.

29. A method for data communication while a Base Station (BS) is disrupted in a wireless communication system, the method comprising:

responsive to receiving a preamble signal from a cluster header through a dedicated control channel while the BS is disrupted, sending a message requesting cluster member subscription to the cluster header;

receiving a cluster member list and resource allocation information from the cluster header; and receiving data transmitted by a source mobile station (MS) based on the resource allocation information.

30. The method of claim 29, further comprising:

sending an ACKnowledgement (ACK) message for the data transmitted to the source MS.

31. The method of claim 29, wherein the message requesting the cluster member subscription comprises at least one of an MS identifier, an indicator determining gateway performance, and location information of an MS.

32. A system for data communication while a Base Station (BS) is disrupted in a wireless communication system, the system comprising:

a plurality of Mobile Stations (MSs) configured to send, responsive to receiving a preamble signal from a cluster header through a dedicated control channel while a BS is disrupted, a message requesting cluster member subscription to the cluster header;

the cluster header comprising the plurality of MSs in a cluster member, configured to configure a cluster member list, and broadcast the cluster member list;

a source MS configured to send a data transmission request message to the cluster header using the cluster member list;

wherein the cluster header is configured to one of unicast and broadcast a response message for the data transmission request of the source MS; and wherein the source MS is configured to transmit data to a target MS among the plurality of MSs based on the response message.

33. The system of claim 32 further comprising:

the target MS configured to send an ACKnowledgement (ACK) message for the data transmission to the source MS.

34. The system of claim 32, wherein the message requesting the cluster member subscription comprises at least one of an MS identifier, an indicator determining gateway performance, and location information of an MS.

35. The system of claim 32, wherein the response message for the data transmission request message comprises at least one of an MS identifier, a confirm code informing data transmission approval, and predefined pre-negotiation information.

36. The system of claim 32, wherein the data transmission request message comprises at least one of a source MS identifier, a target MS identifier, a Quality of Service (QoS) parameter, and a data time slot.

37. The system of claim 32, wherein the data transmission request message is transmitted in a competition scheme.

38. The system of claim 32, wherein the cluster header is further configured to schedule, responsive to the cluster header including a scheduling function, a resource and allocate the resource to a predefined data channel, and one of unicast and broadcast resource allocation information.

39. The system of claim 32, wherein the cluster header is further configured to broadcast, responsive to the cluster header not including a scheduling function, a response message comprising a reserved time slot, wherein the source MS is further configured to transmit data using the reserved time slot, and wherein the target MS is further configured to prepare for data transmission from the source MS through the reserved time slot.

40. A system for data communication while a Base Station (BS) is disrupted in a wireless communication system, the system comprising:

a header of a first cluster comprising a member of the first cluster;

the member of the first cluster configured to inquire, responsive to sensing a preamble signal from a header of a second cluster, about the header of the first cluster whether to merge with the second cluster and send, responsive to the header of the first cluster requesting a merger of the first cluster and second cluster, an access request to the header of the second cluster; and a header of the second cluster configured to transmit, responsive to permitting the merger of the first cluster and second cluster, member information of the second cluster to the member of the first cluster, wherein the header of the first cluster is configured to determine a main cluster based on information on members of the first cluster and information on members of the second cluster, and wherein the header of the second cluster is configured to perform synchronization based on a synchronization signal of the main cluster.

41. The system of claim 40, wherein the member of the first cluster is further configured to broadcast a synchronization signal of the main cluster to at least one sub clusters, wherein members of a sub cluster are configured to stop operation, receive the synchronization signal of the main cluster, and send a synchronization completion message to the member of the first cluster, and wherein the member of the first cluster is further configured to receive the synchronization completion message and notify the header of the first cluster of cluster merger completion.

42. The system of claim 40, wherein the member of the first cluster is further configured to determine the main cluster determines by comparing the number of the members of the first cluster and the number of the members of the second cluster.

43. The system of claim 40, wherein, when the first cluster and the second cluster are merged, the member of the first cluster one of supports that other members of the first cluster move to the second cluster and supports that the members of the second cluster move to the first cluster.

44. The system of claim 40, wherein the member of the first cluster is further configured to connect the first cluster and the second cluster as a gateway to form a first layer, wherein the member of the first cluster is further configured to form a second layer together with other gateways, and wherein the second layer is an upper layer of the first layer.

* * * * *